(12) United States Patent
Okamoto (10) Patent No.: US 9,948,796 B2
(45) Date of Patent: Apr. 17, 2018

(54) IMAGE SCANNER APPARATUS AND RECORDING MEDIUM

(71) Applicant: KYOCERA DOCUMENT SOLUTIONS INC., Osaka (JP)

(72) Inventor: Kentaro Okamoto, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 40 days.

(21) Appl. No.: 15/446,044

(22) Filed: Mar. 1, 2017

(65) Prior Publication Data

US 2017/0257498 A1    Sep. 7, 2017

(30) Foreign Application Priority Data

Mar. 3, 2016  (JP) ................. 2016-040664

(51) Int. Cl.
| | | |
|---|---|---|
| H04N 1/00 | (2006.01) | |
| H04N 1/10 | (2006.01) | |
| G06K 7/10 | (2006.01) | |

(52) U.S. Cl.
CPC ..... *H04N 1/00342* (2013.01); *G06K 7/10336* (2013.01); *G06K 7/10356* (2013.01); *G06K 7/10376* (2013.01); *H04N 1/00702* (2013.01); *H04N 1/00729* (2013.01); *H04N 1/00742* (2013.01); *H04N 1/00774* (2013.01); *H04N 1/1013* (2013.01); *H04N 2201/0081* (2013.01)

(58) Field of Classification Search
None
See application file for complete search history.

(56) References Cited

U.S. PATENT DOCUMENTS

| | | | | |
|---|---|---|---|---|
| 2005/0094183 | A1* | 5/2005 | Kojima | H04N 1/00342 358/1.14 |
| 2009/0231600 | A1* | 9/2009 | Hashimoto | B41J 3/4071 358/1.5 |

FOREIGN PATENT DOCUMENTS

| | | |
|---|---|---|
| JP | 2001-024845 A | 1/2001 |
| JP | 2007-300524 A | 11/2007 |
| JP | 2009-189069 A | 8/2009 |

\* cited by examiner

*Primary Examiner* — Mohammad Ghayour
*Assistant Examiner* — Pawandeep Dhingra
(74) *Attorney, Agent, or Firm* — Li&Cai Intellectual Property (USA) Office (57) ABSTRACT

There is provided an image scanner apparatus, including: a platen; a carriage including an image sensor that captures an image of a script on the platen; an antenna unit on the carriage; and a controller circuit that controls the carriage to move in a forward way and a backward way in a sub-scanning direction over the platen, detects a position of an NFC (Near Field Communication) tag on the script in the sub-scanning direction via the antenna unit, and then detects a position of the NFC tag in a main-scanning direction via the antenna unit.

14 Claims, 6 Drawing Sheets

IMAGE SCANNER APPARATUS AND RECORDING MEDIUM

CROSS REFERENCE TO RELATED APPLICATION

This application claims the benefit of Japanese Priority Patent Application JP2016-040664 filed Mar. 3, 2016, the entire contents of which are incorporated herein by reference.

BACKGROUND OF THE INVENTION

1. Field of the Invention

The present disclosure relates to an image scanner apparatus capable of reading information electrically written in a recording medium on a script to be scanned. The present disclosure further relates to a non-transitory computer readable recording medium that records a program.

2. Description of Related Art

There is known an image scanner apparatus (image scanner), which includes a carriage including antennas arrayed in a main-scanning direction and is capable of reading information electrically written in a small-size recording medium on a script to be scanned.

SUMMARY OF THE INVENTION

According to an embodiment of the present disclosure, there is provided an image scanner apparatus, including: a platen; a carriage including an image sensor that captures an image of a script on the platen; an antenna unit on the carriage; and a controller circuit that controls the carriage to move in a forward way and a backward way in a sub-scanning direction over the platen, detects a position of an NFC tag on the script in the sub-scanning direction via the antenna unit, and then detects a position of the NFC tag in a main-scanning direction via the antenna unit.

According to an embodiment of the present disclosure, there is provided a non-transitory computer readable recording medium that records a program executable by a computer of an image scanner apparatus, the image scanner apparatus including a platen, a carriage including an image sensor that captures an image of a script on the platen, and an antenna unit on the carriage, the program causing the computer to operate as a controller circuit that: controls the carriage to move in a forward way and a backward way in a sub-scanning direction over the platen, detects a position of an NFC tag on the script in the sub-scanning direction via the antenna unit, and then detects a position of the NFC tag in a main-scanning direction via the antenna unit.

These and other objects, features and advantages of the present disclosure will become more apparent in light of the following detailed description of best mode embodiments thereof, as illustrated in the accompanying drawings.

DETAILED DESCRIPTION OF THE PREFERRED EMBODIMENTS

Hereinafter, embodiments of the present disclosure will be described with reference to the drawings.

1. First Embodiment (1-1. Hardware Configuration of Image Scanner Apparatus)

Figure 1:
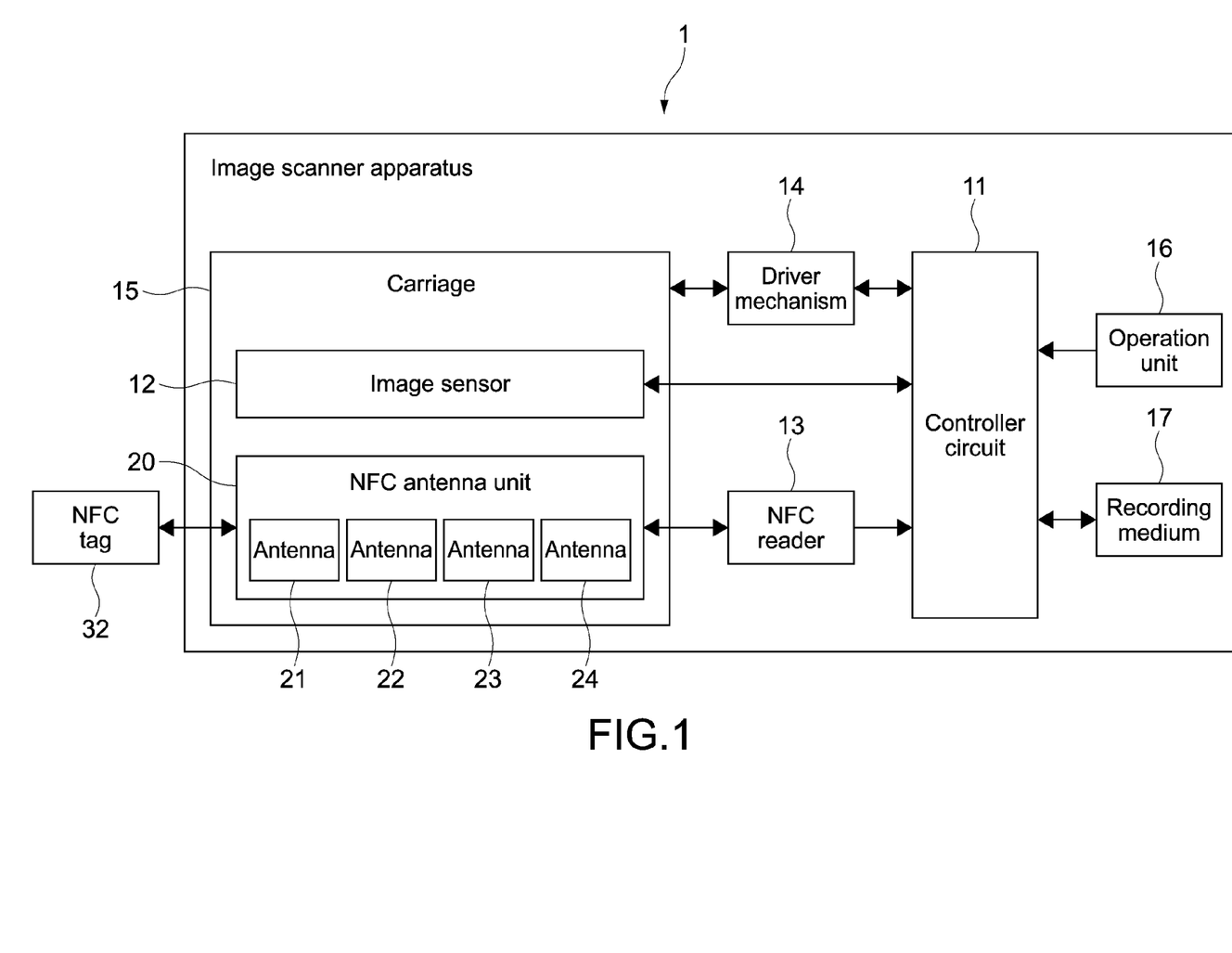
FIG. 1 shows a hardware configuration of an image scanner apparatus of a first embodiment of the present disclosure.

FIG. 1 shows a hardware configuration of an image scanner apparatus of a first embodiment of the present disclosure.

The image scanner apparatus 1 is, typically, an MFP (Multifunction Peripheral), an image scanner, or the like.

The image scanner apparatus 1 at least includes the controller circuit 11, the image sensor 12, the NFC (Near Field Communication) antenna unit 20, the NFC reader 13, the driver mechanism 14, the operation unit 16, and the recording medium 17.

The controller circuit 11 includes a CPU, a RAM, a ROM, dedicated hardware circuits, and the like, and controls the overall operations of the image scanner apparatus 1. The controller circuit 11 is connected to those units, controls operations of those units, and sends/receives signals and/or data to/from those units. The controller circuit 11 records, in the RAM of the controller circuit 11, the position of the NFC tag 32.

The image sensor 12 captures an image of the script 31 (shown in FIG. 2) on the platen 30 (shown in FIG. 2), and converts the image into an electric signal. The image sensor 12 is, for example, a CCD (Charge-Coupled Device) image sensor.

The NFC antenna unit 20 includes the antennas 21 to 24. The antennas 21 to 24 are antennas for near field communication, and sends/receives radio waves for the near field communication to/from the NFC tag 32. The controller circuit 11 activates/disables the antennas 21 to 24 independently and individually.

The NFC reader 13 reads information written in the NFC tag 32 via the antennas 21 to 24 of the NFC antenna unit 20.

The carriage 15 at least includes the image sensor 12 and the NFC antenna unit 20 mounted thereon.

The driver mechanism 14 includes motors and other components, and moves the carriage 15.

The operation unit 16 accepts instructions from a user for various operations and processes that the image scanner apparatus 1 is capable of executing.

The recording medium 17 is a nonvolatile memory such as a hard disk drive, and records information read from the NFC tag 32.

(1-2. Outline of Operations of Image Scanner Apparatus)

Figure 2:
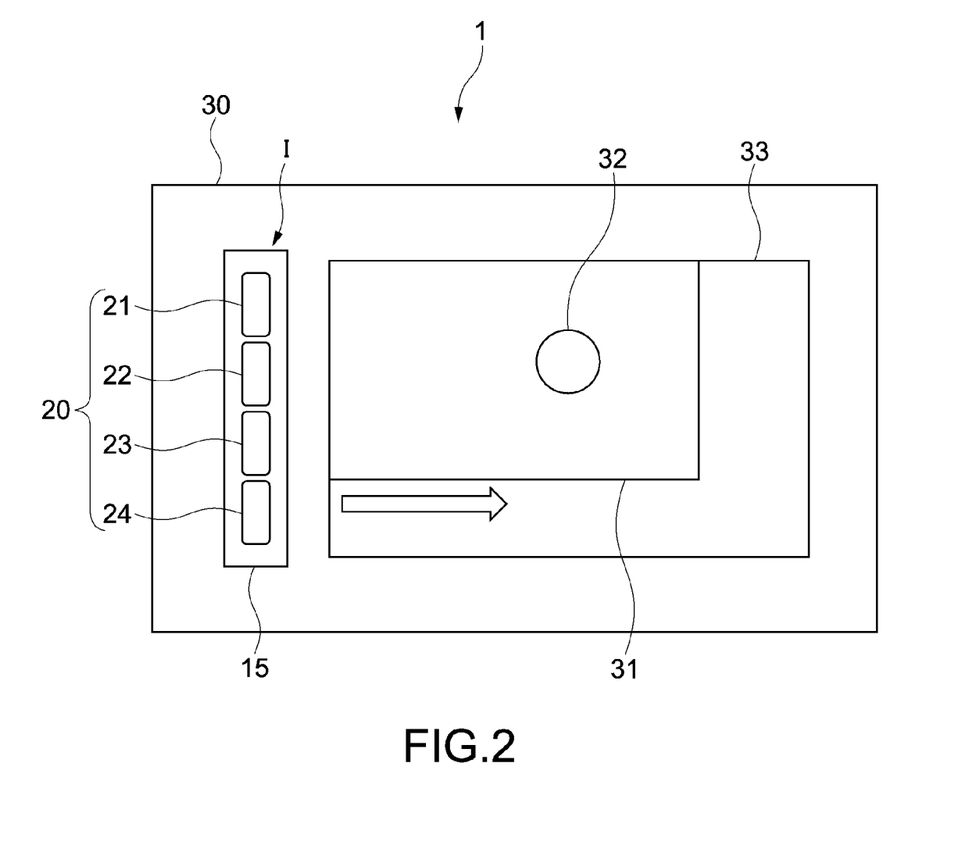
FIG. 2 shows an outline of operations of the image scanner apparatus of the first embodiment.

FIG. 2 shows an outline of operations of the image scanner apparatus of the first embodiment.

The script 31 is placed on the platen 30. The script 31 has the NFC tag 32 attached. For example, the sticker-type NFC tag 32 is attached on the script 31. Information is written in the NFC tag 32.

The carriage 15 includes the antennas (coils) 21 to 24 of the NFC antenna unit 20 mounted thereon. The antennas 21 to 24 are arrayed in the main-scanning direction over the platen 30. In more detail, the antennas 21 to 24 on the carriage 15 are capable of communicating via the near field communication entirely in the main-scanning direction over the area 33 of the platen 30, the script 31 being to be placed on the area 33 (i.e., over the area from one end to the other end of the area 33 in the main-scanning direction). For example, as shown in FIG. 2, the antennas 21 to 24 are uniformly arranged entirely in the main-scanning direction over the area 33 of the platen 30, the script 31 being to be placed on the area 33.

The controller circuit 11 controls the driver mechanism 14 to move the carriage 15 in the forward way and the backward way in the sub-scanning direction over the platen 30. Therefore the antennas 21 to 24 are capable of communicating via the near field communication entirely in the sub-scanning direction over the area 33 of the platen 30, the script 31 being to be placed on the area 33 (i.e., over the area from one end to the other end of the area 33 in the sub-scanning direction).

The antennas 21 to 24 having such a configuration are capable of communicating via the near field communication entirely in the area 33 of the platen 30, the script 31 being to be placed on the area 33.

Each of the antennas 21 to 24 is capable of communicating with the NFC tag 32 in a specific area via the near field communication, each antenna being the center of each area. For example, each of the antennas 21 to 24 may have a sensitivity with which each antenna is capable of communicating with the NFC tag 32 via the near field communication, at least part of the NFC tag 32 facing each antenna. Alternatively, each of the antennas 21 to 24 may have a sensitivity higher than that.

When the carriage 15 moves in the forward-way direction (hereinafter, simply referred to as "move in the forward way") in order that the image sensor 12 may capture an image of the script 31 on the platen 30 (direction of arrow of FIG. 2), the NFC antenna unit 20 on the carriage 15 detects the position of the NFC tag 32 on the script 31 in the sub-scanning direction.

When the carriage 15 moves in the backward-way direction (hereinafter, simply referred to as "move in the backward way") in order that the carriage 15 may return to the initial position I, the NFC antenna unit 20 on the carriage 15 detects the position of the NFC tag 32 on the script 31 in the main-scanning direction, and communicates with the detected NFC tag 32 via the near field communication. The NFC reader 13 reads information written in the NFC tag 32 via the NFC antenna unit 20.

(1-3. Detailed Operations Image Scanner Apparatus)

Figure 3:
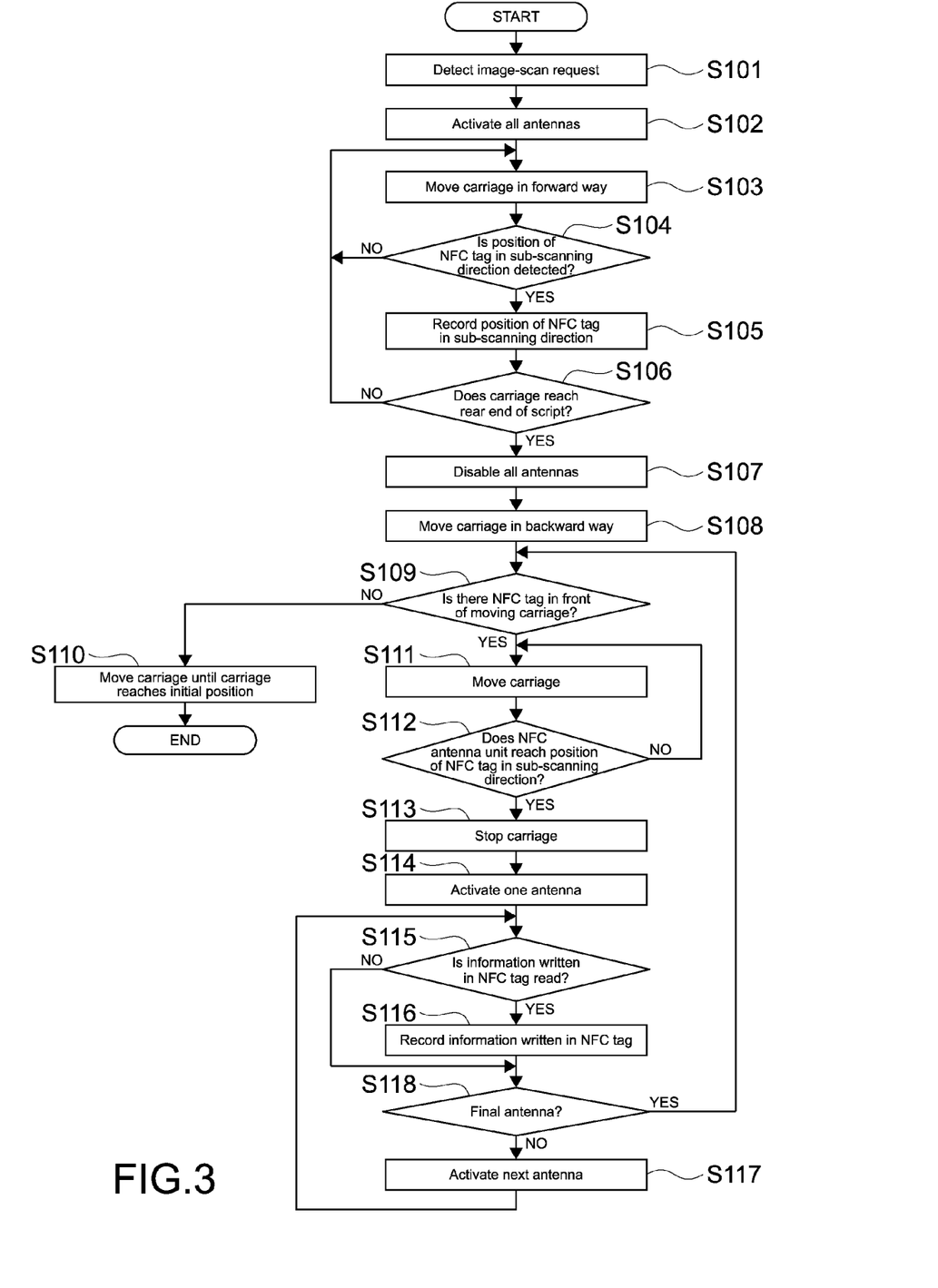
FIG. 3 shows detailed operations the image scanner apparatus of the first embodiment.

FIG. 3 shows detailed operations the image scanner apparatus of the first embodiment (operations for reading information written in NFC tag).

The controller circuit 11 loads an information processing program recorded in a ROM, which is an example of a non-transitory computer readable recording medium, in a RAM to thereby control the image scanner apparatus 1 as follows.

The controller circuit 11 detects, as an image-scan request for capturing an image of the script 31 on the platen 30, a specific operation input in the operation unit 16 by a user (Step S101). When the controller circuit 11 detects the image-scan request, then the controller circuit 11 activates all the antennas 21 to 24 of the NFC antenna unit 20 (Step S102), and controls the driver mechanism 14 to move the carriage 15 at the initial position I in the forward way in the sub-scanning direction (Step S103). Note that the speed of the moving carriage 15 is the same as the normal scanning speed.

The controller circuit 11 detects the position of the NFC tag 32 on the script 31 in the sub-scanning direction via the NFC antenna unit 20 (Step S104, YES). The controller circuit 11 records the detected position of the NFC tag 32 in the sub-scanning direction (Step S105). Note that a script may have a plurality of NFC tags attached. Where a sheet has a plurality of NFC tags attached in the sub-scanning direction, the controller circuit 11 detects and records a plurality of positions. Meanwhile, where a sheet has a plurality of NFC tags attached in the main-scanning direction, the controller circuit 11 detects and records one position, collectively, instead of a plurality of positions of a plurality of NFC tags (i.e., without distinguishing between a plurality of NFC tags).

For an example of a method of detecting the NFC tag 32, the controller circuit 11 detects, as the position of the NFC tag 32 in the sub-scanning direction, the position of the NFC antenna unit 20 at which the NFC reader 13 starts to communicate with the NFC tag 32 via the near field communication via the NFC antenna unit 20 (to be exact, at least one of the antennas 21 to 24). For another example, the controller circuit 11 detects, as the position of the NFC tag 32 in the sub-scanning direction, the position of the NFC antenna unit 20 at which the NFC antenna unit 20 detects a metal (the NFC tag 32) as a result of electromagnetic induction. According to such detection methods, the controller circuit 11 does not stop, in the forward way, the carriage 15 to detect the position of the NFC tag 32 in the sub-scanning direction. Note that, according to this embodiment, all the antennas 21 to 24 are activated (Step S102). Alternatively, to realize those methods, the controller circuit 11 may activate, out of the antennas 21 to 24, one or more antennas at positions at which the one or more antennas are capable of searching the script 31 at least entirely in the main-scanning direction (i.e., area of from one end to the other end of the script 31 in the main-scanning direction).

When the controller circuit 11 moves the carriage 15 to the rear end of the script 31 (Step S106, YES), then the controller circuit 11 controls the driver mechanism 14 to stop the carriage 15, which is moving in the forward way. The controller circuit 11 disables all the antennas 21 to 24 of the NFC antenna unit 20 (Step S107), and controls the driver mechanism 14 to move the carriage 15 in the backward way in the sub-scanning direction (Step S108). Note that the speed of the moving carriage 15 is the same as the normal speed of the carriage 15 returning to the initial position I.

The controller circuit 11 determines if there is an NFC tag 32 in front of the moving carriage 15 or not, the NFC tag 32 being not subjected to the process of Steps S113 to S117 (described later), out of the NFC tag(s) 32 whose position(s) in the sub-scanning direction is/are recorded (Step S105) (Step S109). When the controller circuit 11 determines that there is no NFC tag 32 in the backward way (Step S109, NO), then the controller circuit 11 moves the carriage 15 until the carriage 15 reaches the initial position I (Step S110).

Meanwhile, when the controller circuit 11 determines that there is the NFC tag 32 in the backward way (Step S109, YES), then the controller circuit 11 moves the carriage 15 (Step S111) until the NFC antenna unit 20 reaches the recorded (Step S105) position of the NFC tag 32 in the sub-scanning direction (Step S112). When the NFC antenna unit 20 reaches the position of the NFC tag 32 in the sub-scanning direction (Step S112, YES), then the controller circuit 11 controls the driver mechanism 14 to stop the carriage 15 (Step S113).

When the controller circuit 11 stops the carriage 15, then the controller circuit 11 activates one antenna (for example, the antenna 21) out of the disabled (Step S107) antennas 21 to 24 (Step S114). The controller circuit 11 determines if the NFC reader 13 reads, via the antenna 21, information written in the NFC tag 32 or not (Step S115). When the NFC reader 13 successfully reads information via the antenna 21 (Step S115, YES), then the controller circuit 11 records the read information in the recording medium 17 (Step S116).

Meanwhile, when the NFC reader 13 fails to read information via the antenna 21 (Step S115, NO), then the controller circuit 11 disables the antenna 21, activates another antenna (for example, the antenna 22) (Step S117), and determines if the NFC reader 13 successfully reads information via the antenna 22 or not (Step S115). When the NFC reader 13 successfully reads information, then the controller circuit 11 records the read information in the recording medium 17 (Step S116). The controller circuit 11 activates the antennas 21 to 24 one by one in order, and at the same time, disables the other antennas except for the one activated antenna. The controller circuit 11 tries to read information via all the antennas 21 to 24 (Step S118). Note that, where there are a plurality of NFC tags in the main-scanning direction, the controller circuit 11 reads information written in each NFC tag via each of the antennas, and records the read information pieces in the recording medium 17.

When the controller circuit 11 tries to read information via all the antennas 21 to 24 (Step S118, YES), then the controller circuit 11 returns to Step S109. Where there are a plurality of NFC tags in the sub-scanning direction (Step S109, YES), the controller circuit 11 executes the operational flow on and after Step S111 again, reads information written in all the NFC tags (Step S109, NO), and records the information in the recording medium 17.

(1-4. Conclusion)

There is known a technique in which antennas are arrayed on the carriage in the main-scanning direction, the antennas of the antenna array are activated one by one in order, the antenna array is moved to the next line if there is no IC chip in an area that the antenna array is capable of searching, the antennas are again activated one by one in order, the above-mentioned steps are repeated, and thereby an IC chip on an object to be read is detected. According to this method, the motor for moving the carriage has to be stopped line by line to secure sufficient time for detecting an IC chip, which leads to a low scanning speed.

To the contrary, according to this embodiment, when the carriage 15 is moving in the forward way (Steps S101 to S106), the image scanner apparatus 1 detects the position of the NFC tag 32 in the sub-scanning direction (Step S104). When the carriage 15 is moving in the backward way (Steps S107 to S118), the image scanner apparatus 1 detects the position of the NFC tag 32 in the main-scanning direction and reads information written in the NFC tag 32 (Step S115).

As described above, in the forward way, it is only necessary to simply (i.e., roughly) detect the position of the NFC tag 32 in the sub-scanning direction simply as a result of success/failure of the near field communication or as a result of electromagnetic induction (which is much like analog). Therefore it is not necessary to slow down the speed of the moving carriage 15, which is the same as the normal scanning speed. In the backward way, the carriage 15 stops only at the position of the NFC tag 32 in the sub-scanning direction, which is detected in the forward way, and reads information written in the NFC tag 32. As described above, the carriage 15 stops only at the position, in which it is obvious that the NFC tag 32 exists, and reads information written in the NFC tag 32. Therefore it is possible to minimize the time during which the carriage 15 is stopped in order to detect the position of the NFC tag 32 in the main-scanning direction and read information. Therefore it is possible to minimize the time necessary to move the carriage 15 in the forward way and the backward way. Further, since the single NFC antenna unit 20 detects the position of the NFC tag 32 in the sub-scanning direction and the position of the NFC tag 32 in the main-scanning direction, it is possible to reduce the number of components and downsize the carriage 15.

Further, according to this embodiment, the controller circuit 11 is capable of detecting the positions of a plurality of NFC tags arranged in the sub-scanning direction (Step S104), and of reading information written in a plurality of NFC tags arranged in the main-scanning direction (Steps S114 to S118). Therefore it is possible to read information written in all the plurality of NFC tags on one script.

2. Second Embodiment

Descriptions on configurations, operations, and the like of a second embodiment similar to those of the first embodiment will be omitted, and different points will mainly be described.

(2-1. Hardware Configuration of Image Scanner Apparatus)

Figure 4:
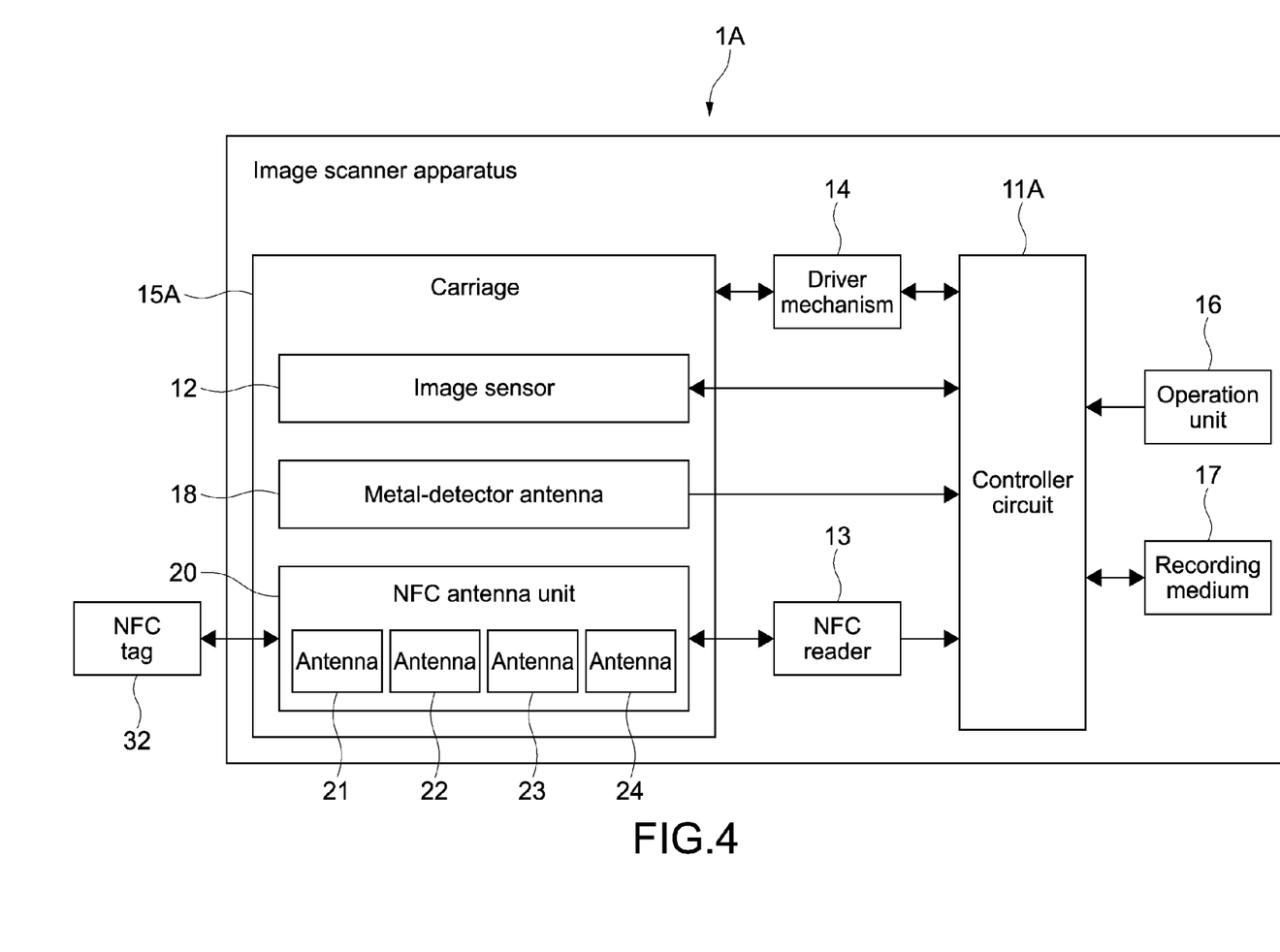
FIG. 4 shows a hardware configuration of an image scanner apparatus according to a second embodiment of the present disclosure.

FIG. 4 shows a hardware configuration of an image scanner apparatus according to a second embodiment of the present disclosure.

The image scanner apparatus 1A includes the controller circuit 11A, the image sensor 12, the NFC antenna unit 20 (second antenna unit), the NFC reader 13, the driver mechanism 14, the operation unit 16, and the recording medium 17, which are similar to those of the image scanner apparatus 1 of the first embodiment. The image scanner apparatus 1A at least further includes the metal-detector antenna 18 (first antenna unit). The metal-detector antenna 18 is mounted on the carriage 15A, and detects a metal as a result of electromagnetic induction.

(2-2. Outline of Operations of Image Scanner Apparatus)

Figure 5:
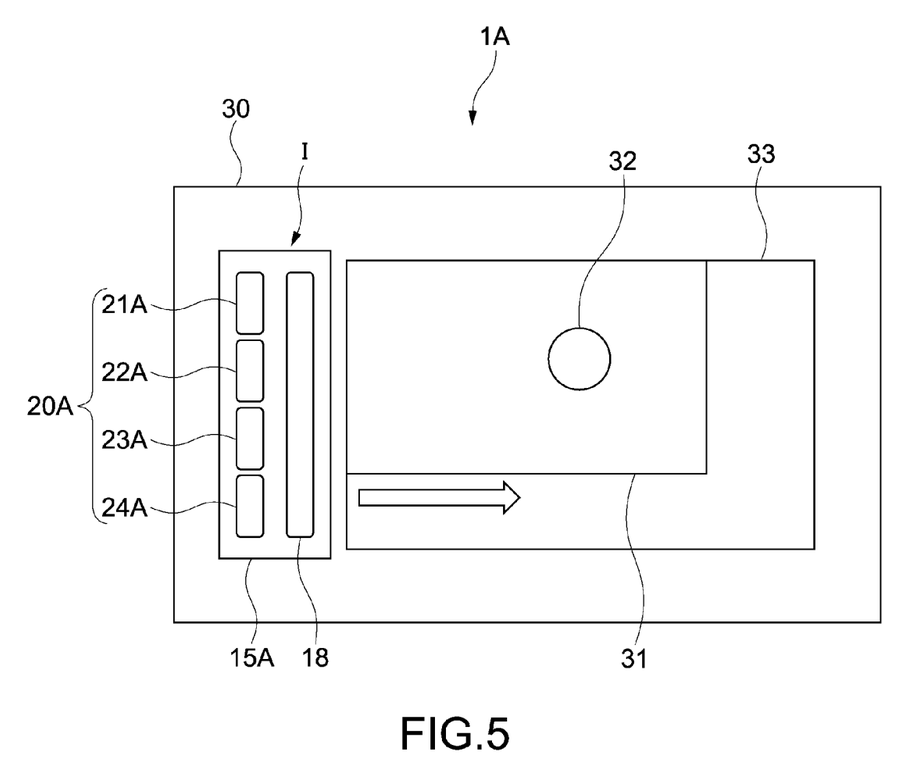
FIG. 5 shows an outline of operations of the image scanner apparatus of the second embodiment.

FIG. 5 shows an outline of operations of the image scanner apparatus of the second embodiment.

The carriage 15A includes the metal-detector antenna 18 and the antennas 21 to 24 of the NFC antenna unit 20 mounted thereon. The metal-detector antenna 18 is at the front side of the carriage 15A in the forward-way moving direction, and the NFC antenna unit 20 is at the rear side of the carriage 15A in the forward-way moving direction.

The metal-detector antenna 18 on the carriage 15 is capable of detecting a metal as a result of electromagnetic induction entirely in the main-scanning direction over the area 33 of the platen 30, the script 31 being to be placed on the area 33 (i.e., over the area from one end to the other end of the area 33 in the main-scanning direction). For example, as shown in FIG. 5, the metal-detector antenna 18 is arranged entirely in the main-scanning direction over the area 33 of the platen 30, the script 31 being to be placed on the area 33. Typically, the metal-detector antenna 18 includes one antenna (coil).

The controller circuit 11A controls the driver mechanism 14 to move the carriage 15 in the forward way and the backward way in the sub-scanning direction over the platen 30. Therefore the metal-detector antenna 18 is capable of detecting a metal entirely in the sub-scanning direction over the area 33 of the platen 30, the script 31 being to be placed on the area 33 (i.e., over the area from one end to the other end of the area 33 in the sub-scanning direction).

Note that the configuration of the NFC antenna unit 20 is similar to that of the first embodiment. Similar to the first embodiment, the NFC antenna unit 20 is capable of communicating via the near field communication entirely in the area 33 of the platen 30, the script 31 being to be placed on the area 33.

When the carriage 15A moves in the forward way in order that the image sensor 12 may capture an image of the script 31 on the platen 30 (direction of arrow of FIG. 5), the metal-detector antenna 18 on the carriage 15A detects the position of the NFC tag 32 on the script 31 in the sub-scanning direction as a result of electromagnetic induction.

When the carriage 15A moves in the backward way in order that the carriage 15 may return to the initial position I, the NFC antenna unit 20 on the carriage 15A detects the position of the NFC tag 32 on the script 31 in the main-scanning direction, and communicates with the detected NFC tag 32 via the near field communication. The NFC reader 13 reads information written in the NFC tag 32 via the NFC antenna unit 20.

(2-3. Detailed Operations Image Scanner Apparatus)

Figure 6:
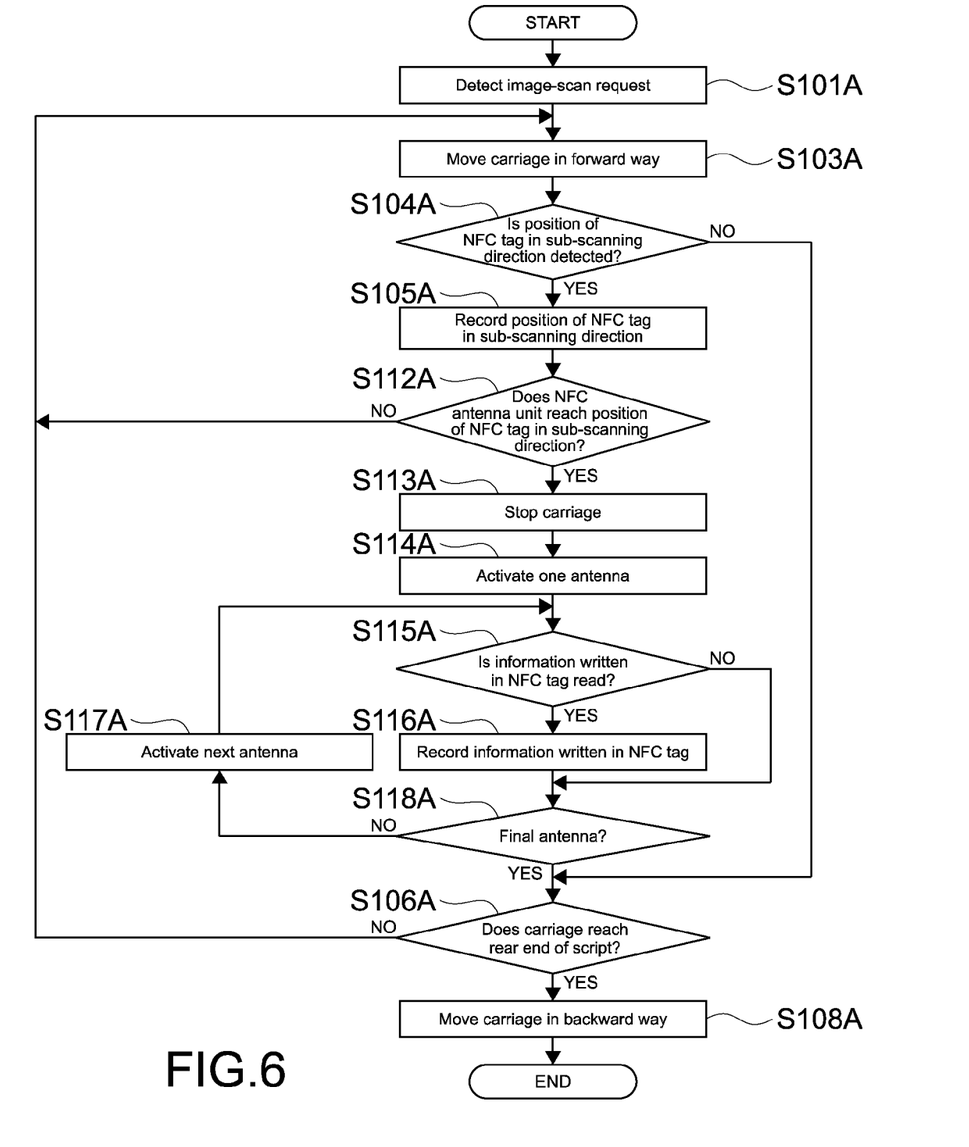
FIG. 6 shows detailed operations the image scanner apparatus of the second embodiment.

FIG. 6 shows detailed operations the image scanner apparatus of the second embodiment (operations for reading information written in NFC tag).

The controller circuit 11A loads an information processing program recorded in a ROM, which is an example of a non-transitory computer readable recording medium, in a RAM to thereby control the image scanner apparatus 1A as follows.

Before starting the operations, the antennas 21 to 24 of the NFC antenna unit 20 are disabled, typically.

The controller circuit 11A detects, as an image-scan request for capturing an image of the script 31 on the platen 30, a specific operation input in the operation unit 16 by a user (Step S101A). When the controller circuit 11A detects the image-scan request, then the controller circuit 11A controls the driver mechanism 14 to move the carriage 15A at the initial position I in the forward way in the sub-scanning direction (Step S103A). Note that the speed of the moving carriage 15A is the same as the normal scanning speed.

The controller circuit 11A detects the position of the NFC tag 32 on the script 31 in the sub-scanning direction via the metal-detector antenna 18 (Step S104A, YES). The controller circuit 11A records the detected position of the NFC tag 32 in the sub-scanning direction (Step S105A).

The controller circuit 11A moves the carriage 15A until the NFC antenna unit 20 reaches the recorded (Step S105A) position of the NFC tag 32 in the sub-scanning direction (Step S112A). When the NFC antenna unit 20 reaches the position of the NFC tag 32 in the sub-scanning direction (Step S112A, YES), then the controller circuit 11A controls the driver mechanism 14 to stop the carriage 15A (Step S113A).

When the controller circuit 11A stops the carriage 15A, then the controller circuit 11A activates one antenna (for example, the antenna 21) out of the antennas 21 to 24 (Step S114A). The controller circuit 11A determines if the NFC reader 13 reads, via the antenna 21, information written in the NFC tag 32 or not (Step S115A). When the NFC reader 13 successfully reads information via the antenna 21 (Step S115A, YES), then the controller circuit 11A records the read information in the recording medium 17 (Step S116A).

Meanwhile, when the NFC reader 13 fails to read information via the antenna 21 (Step S115A, NO), then the controller circuit 11A disables the antenna 21, activates another antenna (for example, the antenna 22) (Step S117A), and determines if the NFC reader 13 successfully reads information via the antenna 22 or not (Step S115A). When the NFC reader 13 successfully reads information, then the controller circuit 11A records the read information in the recording medium 17 (Step S116A). The controller circuit 11A activates the antennas 21 to 24 one by one in order, and at the same time, disables the other antennas except for the one activated antenna. The controller circuit 11A tries to read information via all the antennas 21 to 24 (Step S118A).

When the controller circuit 11A tries to read information via all the antennas 21 to 24 (Step S118A, YES), then the controller circuit 11A controls the driver mechanism 14 to move the carriage 15A until the carriage 15A reaches the rear end of the script 31 (Step S106A, YES), and to move the carriage 15A in the backward way in the sub-scanning direction until the carriage 15A returns to the initial position I (Step S108A). Note that the speed of the moving carriage 15A is the same as the normal speed of the carriage 15A returning to the initial position I.

(2-4. Conclusion)

According to this embodiment, when the carriage 15A is moving in the forward way, the image scanner apparatus 1A detects the position of the NFC tag 32 in the sub-scanning direction via the metal-detector antenna 18 (Step S104A), and detects the position of the NFC tag 32 in the main-scanning direction and reads information written in the NFC tag 32 via the NFC antenna unit 20 (Step S115A).

As described above, firstly, it is only necessary to simply (i.e., roughly) detect the position of the NFC tag 32 in the sub-scanning direction by using the metal-detector antenna 18 as a result of electromagnetic induction. Therefore it is not necessary to slow down the speed of the moving carriage 15A, which is the same as the normal scanning speed. The carriage 15A is stopped only when the NFC antenna unit 20 reaches the detected position of the NFC tag 32 in the sub-scanning direction, and reads information written in the NFC tag 32. As described above, the carriage 15A stops only when the NFC antenna unit 20 reaches the position, in which it is obvious that the NFC tag 32 exists, and reads information written in the NFC tag 32. Therefore it is possible to minimize the time during which the carriage 15A is stopped in order to detect the position of the NFC tag 32 in the main-scanning direction and read information. Therefore it is possible to minimize the time necessary to move the carriage 15A in the forward way and the backward way.

According to this embodiment, not the NFC antenna unit 20 but the dedicated metal-detector antenna 18 detects the position of the NFC tag 32 in the sub-scanning direction, which is different from the first embodiment. Further, the NFC antenna unit 20 only detects the position of the NFC tag 32 in the main-scanning direction and reads information. Therefore, the processing of Step S102 (to activate all the antennas 21 to 24), Step S107 (to disable all the antennas 21 to 24), and other steps of the first embodiment is unnecessary, and in addition, the processing in the backward way is unnecessary. Therefore the processing executed by the controller circuit 11A is simpler than that of the first embodiment.

Note that, when one of the antennas 21 to 24 reads information from the NFC tag 32 in Step S115 of FIG. 2 and Step S115A of FIG. 5, and when information read from the same NFC tag 32 is already recorded in the recording medium 17, the controller circuit 11, 11A may overwrite or delete the read information in Step S116 of FIG. 2 and Step S116A of FIG. 5.

It should be understood by those skilled in the art that various modifications, combinations, sub-combinations and alterations may occur depending on design requirements and other factors insofar as they are within the scope of the appended claims or the equivalents thereof.

What is claimed is:

1. An image scanner apparatus, comprising:
a platen;
a carriage including an image sensor that captures an image of a script on the platen;
an antenna unit on the carriage;
a controller circuit that
controls the carriage to move in a forward way and a backward way in a sub-scanning direction over the platen,
detects a first position of an NFC (Near Field Communication) tag on the script in the sub-scanning direction via the antenna unit, and then
detects a second position of the NFC tag in a main-scanning direction via the antenna unit; and
an NFC reader that reads, via the antenna unit, information written in the NFC tag, wherein
the controller circuit
detects, in the forward way of the move-in-the-forward-way-and-the-backward-way, the first position of the NFC tag via the antenna unit, then
detects, in the backward way of the move-in-the-forward-way-and-the-backward-way, the second position of the NFC tag via the antenna unit, the NFC tag being at the detected first position, and
when detecting the second position, controls the NFC reader to read information written in the NFC tag, the NFC tag being at the detected first position in the sub-scanning direction and being at the detected second position in the main-scanning direction.

2. The image scanner apparatus according to claim 1, wherein
the antenna unit includes antennas arrayed in the main-scanning direction over the platen, and
the controller circuit activates, in the forward way, one or more antennas out of the antennas, the one or more antennas being at positions at which the one or more antennas are capable of detecting the NFC tag at least entirely in the main-scanning direction over the script.

3. The image scanner apparatus according to claim 2, wherein
the controller circuit activates, in the forward way, all the antennas.

4. The image scanner apparatus according to claim 2, wherein
the controller circuit, in the backward way,
stops the carriage at a position in the sub-scanning direction at which the antenna unit is capable of communicating with the NFC tag at the detected first position,
activates the antennas one by one in order,
detects the NFC tag via one antenna being activated, and then
controls the NFC reader to read, via the antenna, the information written in the detected NFC tag.

5. The image scanner apparatus according to claim 1, wherein the controller circuit detects, in the forward way, as the first position of the NFC tag, a position in the sub-scanning direction of the antenna unit at which the NFC reader starts to communicate with the NFC tag via near field communication via the antenna unit.

6. The image scanner apparatus according to claim 1, wherein
the controller circuit detects, in the forward way, as the first position of the NFC tag, a position in the sub-scanning direction of the antenna unit at which the antenna unit detects a metal as a result of electromagnetic induction.

7. An image scanner apparatus, comprising:
a platen;
a carriage including an image sensor that captures an image of a script on the platen;
a first antenna unit on the carriage, the first antenna unit detecting the position of the NFC tag in a sub-scanning direction;
a second antenna unit on the carriage, the second antenna unit being behind the first antenna unit in a forward-way moving direction, the second antenna unit detecting the position of the NFC tag in a main-scanning direction;
a controller circuit that
controls the carriage to move in the forward way and a backward way in the sub-scanning direction over the platen,
detects a first position of an NFC tag on the script in the sub-scanning direction via the first antenna unit, and then
detects a second position of the NFC tag in the main-scanning direction via the second antenna unit; and
an NFC reader that reads, via the second antenna unit, information written in the NFC tag, wherein
the controller circuit
detects, in the forward way of the move-in-the-forward-way-and-the-backward-way, the first position of the NFC tag via the first antenna unit, then
detects, in the forward way of the move-in-the-forward-way-and-the-backward-way, the second position of the NFC tag via the second antenna unit, the NFC tag being at the detected first position, and
when detecting the second position, controls the NFC reader to read information written in the NFC tag, the NFC tag being at the detected first position in the sub-scanning direction and being at the detected second position in the main-scanning direction.

8. The image scanner apparatus according to claim 7, wherein
the first antenna unit is at a position at which the first antenna unit is capable of detecting the NFC tag at least entirely in the main-scanning direction over the script.

9. The image scanner apparatus according to claim 7, wherein
the second antenna unit includes antennas arrayed in the main-scanning direction over the platen at least entirely in the main-scanning direction over the script, and
the controller circuit
stops the carriage at a position in the sub-scanning direction at which the second antenna unit is capable of communicating with the NFC tag at the detected first position,
activates the antennas one by one in order,
detects the NFC tag via one antenna being activated, and then controls the NFC reader to read, via the antenna, the information written in the detected NFC tag.

10. The image scanner apparatus according to claim 7, wherein
the controller circuit detects, as the first position of the NFC tag, a position in the sub-scanning direction of the first antenna unit at which the first antenna unit detects a metal as a result of electromagnetic induction.

11. The image scanner apparatus according to claim 7, wherein
the controller circuit
after detecting the first position, stops the carriage at a position in the sub-scanning direction at which the second antenna unit is capable of communicating with the NFC tag at the detected first position, and
controls the NFC reader, at the position at which the carriage stops, to read the information written in the NFC tag at the detected second position.

12. A non-transitory computer readable recording medium that records a program executable by a computer of an image scanner apparatus,
the image scanner apparatus including
a platen,
a carriage including an image sensor that captures an image of a script on the platen, and
an antenna unit on the carriage,
the program causing the computer to operate as a controller circuit that:
controls the carriage to move in a forward way and a backward way in a sub-scanning direction over the platen,
detects a first position of an NFC tag on the script in the sub-scanning direction via the antenna unit, and then
detects a second position of the NFC tag in a main-scanning direction via the antenna unit,
the program causing the computer to operate as an NFC reader that reads, via the antenna unit, information written in the NFC tag, wherein
the controller circuit
detects, in the forward way of the move-in-the-forward-way-and-the-backward-way, the first position of the NFC tag via the antenna unit, then
detects, in the backward way of the move-in-the-forward-way-and-the-backward-way, the second position of the NFC tag via the antenna unit, the NFC tag being at the detected first position, and
when detecting the second position, controls the NFC reader to read information written in the NFC tag, the NFC tag being at the detected first position in the sub-scanning direction and being at the detected second position in the main-scanning direction.

13. A non-transitory computer readable recording medium that records a program executable by a computer of an image scanner apparatus,
the image scanner apparatus including
a platen,
a carriage including an image sensor that captures an image of a script on the platen,
a first antenna unit on the carriage, the first antenna unit detecting the position of the NFC tag in a sub-scanning direction, and
a second antenna unit on the carriage, the second antenna unit being behind the first antenna unit in a forward-way moving direction, the second antenna unit detecting the position of the NFC tag in a main-scanning direction,
the program causing the computer to operate as a controller circuit that:
controls the carriage to move in the forward way and a backward way in the sub-scanning direction over the platen,
detects a first position of an NFC tag on the script in the sub-scanning direction via the first antenna unit, and then
detects a second position of the NFC tag in the main-scanning direction via the second antenna unit,
the program causing the computer to operate as an NFC reader that reads, via the second antenna unit, information written in the NFC tag, wherein
the controller circuit
detects, in the forward way of the move-in-the-forward-way-and-the-backward-way, the first position of the NFC tag via the first antenna unit, then
detects, in the forward way of the move-in-the-forward-way-and-the-backward-way, the second position of the NFC tag via the second antenna unit, the NFC tag being at the detected first position, and
when detecting the second position, controls the NFC reader to read information written in the NFC tag, the NFC tag being at the detected first position in the sub-scanning direction and being at the detected second position in the main-scanning direction.

14. The non-transitory computer readable recording medium according to claim 13, wherein
the controller circuit
after detecting the first position, stops the carriage at a position in the sub-scanning direction at which the second antenna unit is capable of communicating with the NFC tag at the detected first position, and
controls the NFC reader, at the position at which the carriage stops, to read the information written in the NFC tag at the detected second position.

* * * * *